July 18, 1967 G. E. GOULD 3,331,100

EXTRUSION APPARATUS

Filed Jan. 6, 1966

INVENTOR.
Gordon E. Gould
BY
AGENT

United States Patent Office 3,331,100
Patented July 18, 1967

3,331,100
EXTRUSION APPARATUS
Gordon E. Gould, Breckenridge, Mich., assignor to The Dow Chemical Company, Midland, Mich., a corporation of Delaware
Filed Jan. 6, 1966, Ser. No. 519,066
6 Claims. (Cl. 18—12)

This invention relates to an improved extrusion apparatus and more particularly relates to an extrusion apparatus of the screw extruder variety wherein the screw has a heat exchange fluid passed therein.

Frequently, in the extrusion of synthetic resinous thermoplastic materials it is desirable that the barrel of the extruder be heated and that heat exchange fluid be provided to the screw in order to obtain a relatively uniform temperature of the plastic melt and rapid heat plastification of granular material fed to the screw extruder. Oftentimes it is desirable that the screw of such a screw extruder machine have at least two heat exchange zones, the first generally adjacent the inlet of the granular material and a second heat exchange zone generally adjacent the outlet or extrusion orifice. By employing two zones it is possible to increase the heat input to the granular polymer in the first zone adjacent the polymer inlet or melt zone and to provide to the second zone temperature control which serves to bring the temperature of the polymer to be extruded to extrusion temperature employing a barrel of relatively short length. Generally internally heated and/or cooled extrusion screws are utilized wherein a plug is friction fitted within the extruder screw to separate the internal cavity of a hollow screw into two heat exchange zones. Suitable conduits are provided for the circulation of the heat exchange fluid. Considerable difficulty is encountered when the position of the plug or divider must be changed. Generally the extruder must be disassembled, that is the screw removed, the plug bored from within the screw, and a new plug installed. Such a procedure is costly and time consuming and is especially undesirable in experimental equipment wherein changes are oftentimes required.

It would be advantageous if there were available an improved extrusion apparatus of the screw extruder variety wherein the screw is readily divided into at least two heat transfer zones and the means of dividing moved.

It would be advantageous if there were available an improved screw extrusion apparatus having at least two heat exchange zones within the extruder screw wherein the zone could be varied without removal of the screw from the apparatus.

These benefits and other advantages in accordance with the present invention are achieved in an apparatus for the extrusion of synthetic resinous thermoplastic material comprising in cooperative combination a screw extruder having a barrel, the barrel having a first end and a second end, means to provide synthetic resinous thermoplastic material to the first end of the barrel, means to discharge heat plastified thermoplastic resinous material from the second end of the barrel, a screw disposed within the barrel and adapted to forward heat plastified synthetic thermoplastic resinous material from the first end to the second end of the barrel, the screw defining an internal cavity having a generally cylindrical configuration, a plug within the cylindrical cavity adapted to divide the cavity into first and second heat exchange zones, the first heat exchange zone being disposed adjacent the first end of the barrel, the second heat exchange zone being disposed adjacent the second end of the barrel, an inlet and outlet conduit connecting with the first heat exchange zone, an inlet and outlet conduit connecting with the second heat exchange zone, the improvement which comprises an expansible plug so constructed and arranged so as to selectively engage and disengage from the wall of the cavity within the screw.

Further features and advantages of the present invention will become more apparent from the following specification when taken in connection with the drawing wherein:

In FIGURE 1 there is schematically illustrated a sectional view of an extrusion apparatus in accordance with the invention.

In FIGURE 2 there is illustrated a sectional view of an alternate embodiment of expansible plug for use in the apparatus of FIGURE 1.

FIGURES 3 and 4 depict two views of a portion of the plug of FIGURE 2.

In FIGURE 1 there is illustrated a schematic sectional view of an extrusion apparatus in accordance with the invention. The apparatus is generally designated by the reference numeral 10. The apparatus 10 is a screw extruding machine comprising a barrel 11, the barrel 11 has a first end 12, and a second end 13, the barrel 11 defines an internal cylindrical cavity 14, adjacent the first end 12 of the barrel 11 is a feed port 15 in operative communication with a supply means 16 for the provision of particulate synthetic resinous thermoplastic material, the feed port 15 provides communication between the internal cavity 14 of the barrel 11, an extrusion die 18 is in cooperative communication with the second end 13 of the barrel 11, the die 18 defines an extrusion orifice 19 which is in communication with the cavity 14, a screw or worm 21 is disposed within the cavity 14, the screw 21 comprises a body portion 22 having an external generally cylindrical surface 23 and a helical land 24 disposed about the cylindrical surface 23, the body 22 defines an internal cavity 26 having a first end 28 generally disposed adjacent the first end 12 of the barrel 11, and a second end 29 disposed generally adjacent the extrusion die 18, a first conduit 30 extends from a location external to the screw 21 into the cavity 26 and terminates generally adjacent the second end 29, a second conduit 31 is coaxially disposed with relationship to the first conduit 30 and extends into the cavity 26 and terminates at a location between the first and second ends 28 and 29, respectively, of the cavity 26. The conduit 31 has affixed thereto an expansible plug assembly 33, the assembly 33 comprises a first or fixed body portion 34 rigidly secured to the conduit 31, the first body portion conforms generally to the internal cross sectional configuration of the cavity 26 and defines a generally frustoconical camming surface 35. A second plug body portion 36 is threadably mounted on the conduit 31, the body portion 36 defines a generally frustoconical camming surface 37. The surfaces 35 and 37 are generally oppositely disposed and outwardly facing. An expander or sealing ring 38 is disposed between the camming surfaces 35 and 37 and is so constructed and arranged that when the portion 36 is rotated into the conduit 31 in the appropriate direction, the body portion 36 abuts the body portion 34 and the expander ring is forced into sealing engagement with a portion of the screw 21 defining a cavity 26 thereby dividing the cavity 26 into first and second portions corresponding to the ends 28 and 29. A rotating means 40 is affixed to the body portion 36 generally adjacent the first end 28 of the cavity 26, a third conduit 42 is coaxially disposed about the portion of the second conduit 31, the conduit 42 has an internal end 43 having engaging means 44 disposed thereon and adapted to engage the rotating means 40 of the body 36, a fourth conduit 45 is coaxially disposed about the third conduit 42, the conduit 45 terminates generally adjacent the first end 28 of the cavity 26, a packing assembly 47 seals the fourth conduit 45 into the screw 21, a rotary joint 48 is in operative engagement with a portion of a conduit 45 extending outside of the cavity 26. A packing assembly 50 secures the fourth conduit 45 to the third conduit 42 generally adjacent the rotary joint 48 and remote from the packing assembly 47. A rotary joint 51 is in operative engagement with the third conduit at a location generally adjacent the packing assembly 50 and remote from the rotary joint 48. A packing assembly 52 secures the third conduit 42 to the second conduit 31 at a location adjacent the rotary joint 51 and remote from the packing assembly 50. A rotary joint 53 is in operative engagement with the second conduit 31 at a location generally adjacent the packing assembly 52 and remote from the rotary joint 51. A packing assembly 55 secures the second conduit 31 to the first conduit 30, a rotary joint 56 is in operative engagement with the first conduit 30 at a location generally adjacent the packing assembly 55 and remotely disposed from the rotary joint 52, heat exchange fluid conduits 58, 59, 60 and 61 are in cooperative combination with the rotary joints 48, 51, 53 and 56, respectively.

In operation of the embodiment of the invention as depicted in FIGURE 1 in normal operating conditions the body portions 36 and 34 of the plug 33 are forced together by the engaging means 44 on the third conduit 42 causing the expander or sealing ring 38 to seal a cavity 26 into a first portion and a second portion. Advantageously the body portion 36 is affixed to the conduit 31 by means of screw threads having a land such that any slippage caused by the friction of the rotary joints causes the joint to tighten rather than loosen. When it is desired to alter the location of the plug 33, the packing assembly 50 is loosened, the third conduit 42 is slid into the cavity 26 until the engaging means 44 engages the rotating means of the body portion 36, the body portion 46 is then rotated by means of a conduit 42 until the plug assembly is free to slide within the cavity 26, the second conduit 31 is then axially positioned within the cavity 26 to a desired position, the third conduit 42 is then slideably positioned so that the engaging means 44 engages the rotating means 40 and the plug assembly 33 is tightly secured within the cavity, beneficially the conduits 30, 31, 42 and 45 have lengths which permit sliding of the plug 33 within the desired limits. Thus extrusion may be accomplished in the desired manner and heat exchange fluid supplied and removed from first and second zones of readily alterable dimensions.

In FIGURE 2 there is illustrated an alternate plug in accordance with the present invention generally described by the reference numeral 65, the plug 65 comprises in cooperative combination a conduit 66 having a terminal end 67, a terminal end 67 of the conduit 66 defines an externally threaded surface 67', a shoulder member 68 is rigidly secured to the terminal end 67 of the conduit 66, a camming member 69 is positioned adjacent the shoulder member 68, the camming member 69 has a generally frustoconical outwardly facing surface 70 which is in engagement with an expanding member or expander ring 71 disposed adjacent the surface 70 of the camming member 69. The expanding member defines a generally radially outwardly extending surface 72 and a frustoconical surface 73 adapted to mate with the surface 70. A ring member 75 is slideably disposed upon the conduit 66 and contacts the radially outwardly extending surface 72, a cavity engaging member 78 is disposed adjacent the ring member 75 and is operatively in engagement therewith by means of a plurality of arms 79. The arms 79 engage a frustoconical camming surface 76 on the ring member 75 and the frustoconical camming surface 76 is adapted to force the arms 79 radially outwardly.

Figure 4:
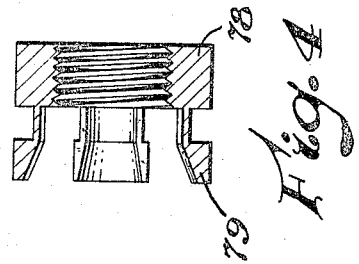
FIGURE 4 depicts engaging member 78 illustrating the arms 79.
Figure 1:
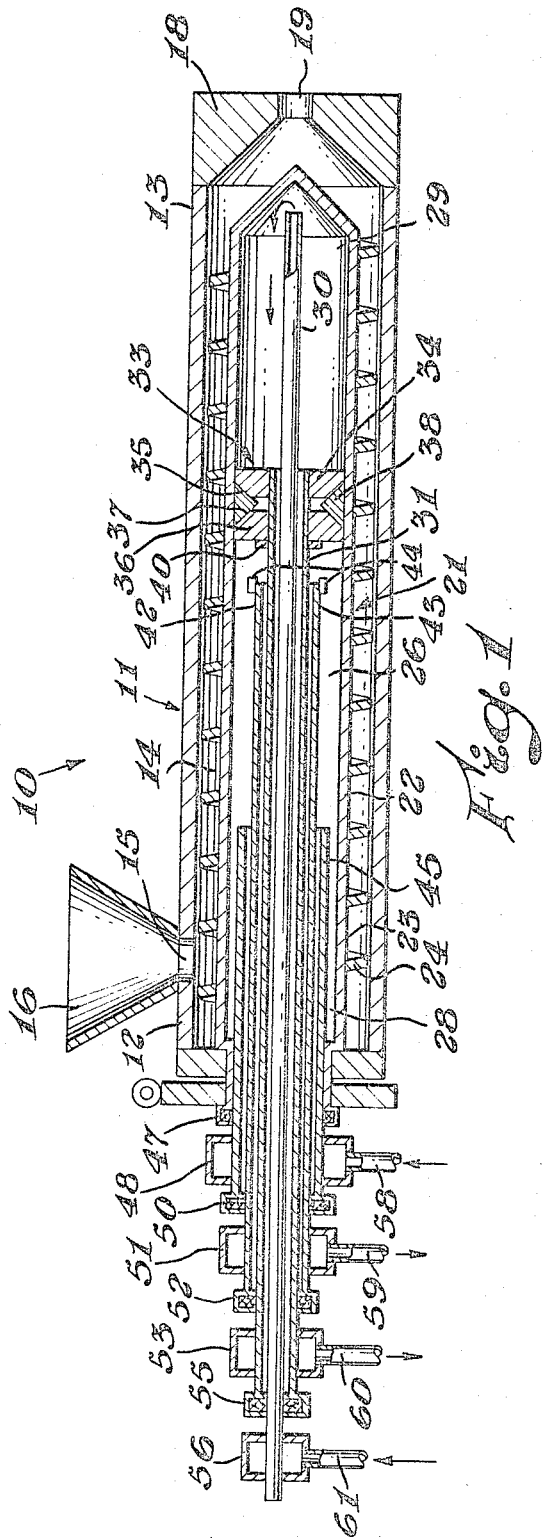
Figure 3:
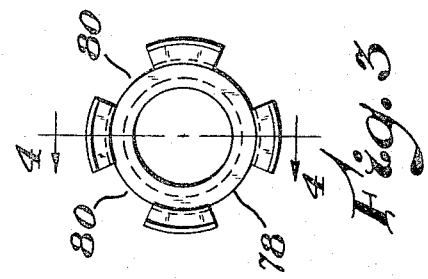
FIGURE 3 is a view of the engaging member 78 viewed from left to right and showing a plurality of external slots or grooves 80 particularly adapted to engage a rotating means not shown.
Figure 2:
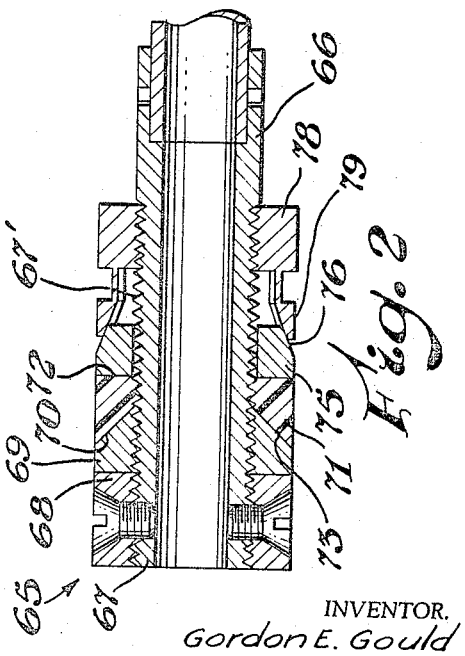

In operation of the embodiment as depicted in FIGURES 2, 3 and 4 the conduit 66 is positioned within the cavity of the extruder screw, a second conduit is positioned under the conduit 66, the second conduit terminates in lugs which engage the grooves 80 of the engaging member 78, rotating the conduit 66 in the appropriate direction causes the caming surface 76 to force the arms 79 into engagement with the bore of the extruder screw, continued rotation of the conduit 66 causes the surface 69 to force the expander or sealing ring 71 into a sealing engagement with the bore of the extruder. Third and fourth conduits are employed in the manner of FIGURE 1.

Generally it is desirable to utilize a resilient material for the sealing members such as the members 38 or 71, such sealing members are prepared from rubber or synthetic resinous material such as polytetrafluoroethylene and like resilient or deformable compositions which resist extrusion temperatures and heat exchange fluid. Employing the apparatus substantially in accordance with the present invention, the heat exchange zone within the extruder screw was readily varied without the necessity of disassembly of the extruder.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention excepting as it is set forth and defined in the hereto appended claims.

What is claimed is:

1. In an apparatus for the extrusion of synthetic resinous thermoplastic material comprising in cooperative combination a screw extruder having a barrel, the barrel having a first end, a second end, means to provide synthetic resinous thermoplastic material to the first end of the barrel, means to discharge heat plastified thermoplastic material from the second end of the barrel, a screw disposed within the barrel and adapted to forward heat plastified synthetic thermoplastic resinous material from the first end to the second end of the barrel, the screw defining an internal cavity having a generally cylindrical configuration, a plug within the cylindrical cavity adapted to divide the cavity into first and second heat exchange zones, the first of said zones being disposed adjacent the first end of the barrel, the second heat exchange zone being disposed adjacent the second end of the barrel, an inlet conduit and an outlet conduit operatively connected with the first heat exchange zone, an inlet and an outlet conduit operatively connected with the second heat exchange zone, the improvement which comprises an expansible plug so constructed and arranged so as to selectively engage and disengage a wall of the cavity within the screw.

2. The apparatus of claim 1 wherein the inlet and outlet conduits for the second zone are coaxially disposed within the outlet and inlet conduits of the first zone.

3. The apparatus of claim 2 wherein one of the conduits of the second zone has secured thereto the expansible plug.

4. The apparatus of claim 3 wherein one of the conduits of the first zone is adapted to engage the expansible plug and selectively engage and disengage the plug from the wall cavity.

5. The apparatus of claim 4 wherein a plurality of rotary joints and seals provide communication with the inlet and outlet conduits of the first and second heat exchange zones.

6. The apparatus of claim 5 wherein the expansible plug comprises a fixed body portion secured to a conduit of the second heat exchange zone, a second body portion threadably affixed to the conduit of the second heat exchange zone, an expander or sealing ring disposed between the body portions and adapted to engage the internal wall of the screw cavity on rotation of the threadably mounted body portion.

References Cited
UNITED STATES PATENTS

| | | |
|---|---|---|
| 2,449,355 | 9/1948 | Wiley et al. _____ 18—12 |
| 2,641,800 | 6/1953 | Meyers _____ 18—12 |
| 2,653,348 | 9/1953 | Elgin et al. _____ 18—12 |
| 3,007,198 | 11/1961 | Colwell et al. _____ 18—12 |

WILLIAM J. STEPHENSON, *Primary Examiner.*